United States Patent
Larson et al.

(10) Patent No.: US 9,446,568 B2
(45) Date of Patent: Sep. 20, 2016

(54) BUILDING MEMBRANE

(75) Inventors: Timothy Larson, Boonton, NJ (US); William P. Kuhn, Stonington, CT (US); Edward Nebesnak, Mine Hill, NJ (US); Li-Ying Yang, Whippany, NJ (US)

(73) Assignee: BUILDING MATERIALS INVESTMENT CORPORATION, Wilmington, DE (US)

( * ) Notice: Subject to any disclaimer, the term of this patent is extended or adjusted under 35 U.S.C. 154(b) by 1090 days.

(21) Appl. No.: 11/083,786

(22) Filed: Mar. 18, 2005

(65) Prior Publication Data

US 2005/0210808 A1 Sep. 29, 2005

Related U.S. Application Data

(60) Provisional application No. 60/555,523, filed on Mar. 23, 2004.

(51) Int. Cl.

| | |
|---|---|
| *B44C 3/08* | (2006.01) |
| *B44C 5/04* | (2006.01) |
| *B32B 27/12* | (2006.01) |
| *D06N 5/00* | (2006.01) |
| *E04D 1/26* | (2006.01) |
| *E04D 5/10* | (2006.01) |
| *E04D 5/12* | (2006.01) |
| *E04F 13/00* | (2006.01) |
| *B32B 38/14* | (2006.01) |
| *B41F 19/06* | (2006.01) |
| *B41F 19/02* | (2006.01) |
| *B32B 38/06* | (2006.01) |

(52) U.S. Cl.
CPC .............. *B32B 27/12* (2013.01); *D06N 5/00* (2013.01); *E04D 1/26* (2013.01); *E04D 5/10* (2013.01); *E04D 5/12* (2013.01); *E04F 13/002* (2013.01); *B32B 38/06* (2013.01); *B32B 38/14* (2013.01); *B41F 19/02* (2013.01); *B41F 19/06* (2013.01); *D06N 2203/08* (2013.01); *Y10T 156/1023* (2015.01)

(58) Field of Classification Search
CPC ........ B32B 27/20; B41F 19/02; B41F 19/06; Y10T 156/1023
USPC .......... 52/528, 557, 558, 554, 555; 156/250, 156/277, 209, 219; 425/132, 110; 427/197
See application file for complete search history.

(56) References Cited

U.S. PATENT DOCUMENTS

| | | | | |
|---|---|---|---|---|
| 3,608,261 A | * | 9/1971 | French et al. | 52/316 |
| 3,953,638 A | * | 4/1976 | Kemp | A47K 10/16 156/183 |
| 4,284,065 A | * | 8/1981 | Brill-Edwards | 126/668 |
| 4,312,686 A | * | 1/1982 | Smith | B29C 43/305 156/209 |
| 4,390,585 A | * | 6/1983 | Holden | 428/172 |
| 4,773,959 A | * | 9/1988 | Smith | B29C 59/046 156/220 |

(Continued)

*Primary Examiner* — Chi Q Nguyen
(74) *Attorney, Agent, or Firm* — Tarter Krinsky & Drogin LLP

(57) ABSTRACT

The present invention is a single ply building membrane comprising a single ply membrane with a base and a cap layer and a top and bottom surface, having a predetermined printed design on the cap layer, and a predetermined texture on at least one surface of the membrane. The membrane may comprise compounds selected from the group consisting of thermoplastics and thermosets. The printed and textured designs may be of a laid roof or siding. The invention includes a method of installing a single ply building membrane on a building surface and a method of manufacturing such membrane.

15 Claims, 6 Drawing Sheets

(56) References Cited

U.S. PATENT DOCUMENTS

| | | | | |
|---|---|---|---|---|
| 4,936,071 | A * | 6/1990 | Karrfalt | 52/420 |
| 5,037,685 | A * | 8/1991 | Richards et al. | 428/40.5 |
| 5,293,727 | A * | 3/1994 | Yoshimoto et al. | 52/560 |
| 5,304,272 | A * | 4/1994 | Rohrbacker | B32B 27/30 156/209 |
| 5,471,807 | A * | 12/1995 | Vasquez | 52/553 |
| 5,486,249 | A * | 1/1996 | Valaitis et al. | 156/71 |
| 5,657,603 | A * | 8/1997 | Goodhart et al. | 52/519 |
| 5,895,536 | A * | 4/1999 | Starr et al. | 156/71 |
| 6,033,737 | A * | 3/2000 | Johnson et al. | 427/385.5 |
| 6,055,786 | A * | 5/2000 | Hubbard et al. | 52/409 |
| 6,148,578 | A * | 11/2000 | Nowacek et al. | 52/518 |
| 6,238,502 | B1 * | 5/2001 | Hubbard | 156/71 |
| 6,416,607 | B1 * | 7/2002 | Tsai | B32B 38/1833 156/209 |
| 6,426,129 | B1 * | 7/2002 | Kalwara et al. | 428/41.8 |
| 6,473,724 | B1 * | 10/2002 | Soto | 703/7 |
| 6,502,360 | B2 * | 1/2003 | Carr et al. | 52/408 |
| 6,503,601 | B1 | 1/2003 | Edvardsen | |
| 6,516,572 | B1 * | 2/2003 | Nowacek et al. | 52/90.1 |
| 6,544,909 | B1 * | 4/2003 | Venkataswamy et al. | 442/38 |
| 6,764,968 | B1 * | 7/2004 | Hindi et al. | 442/37 |
| 6,769,215 | B1 * | 8/2004 | Carkner | 52/411 |
| 6,864,194 | B2 * | 3/2005 | Hindi et al. | 442/37 |
| 7,101,598 | B2 * | 9/2006 | Hubbard | 428/40.1 |
| 7,422,520 | B2 * | 9/2008 | Coulton et al. | 454/365 |
| 7,745,353 | B2 * | 6/2010 | Arthurs et al. | 442/2 |
| 8,944,543 | B2 * | 2/2015 | Hansson | B32B 5/30 347/2 |

* cited by examiner

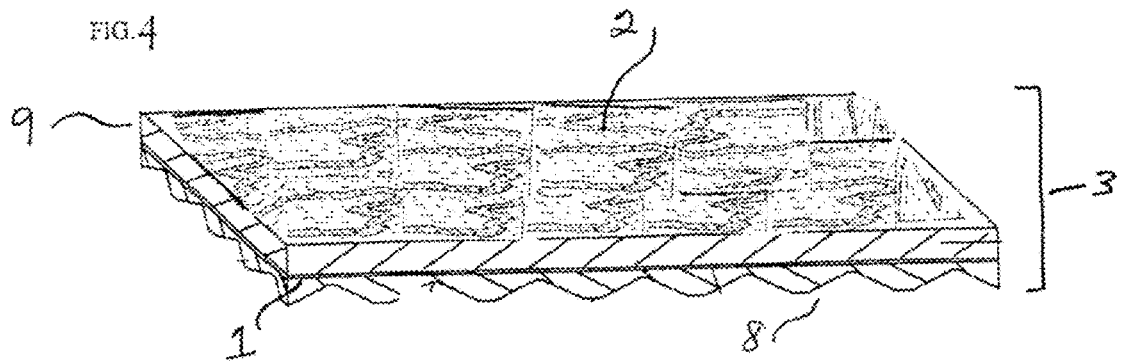
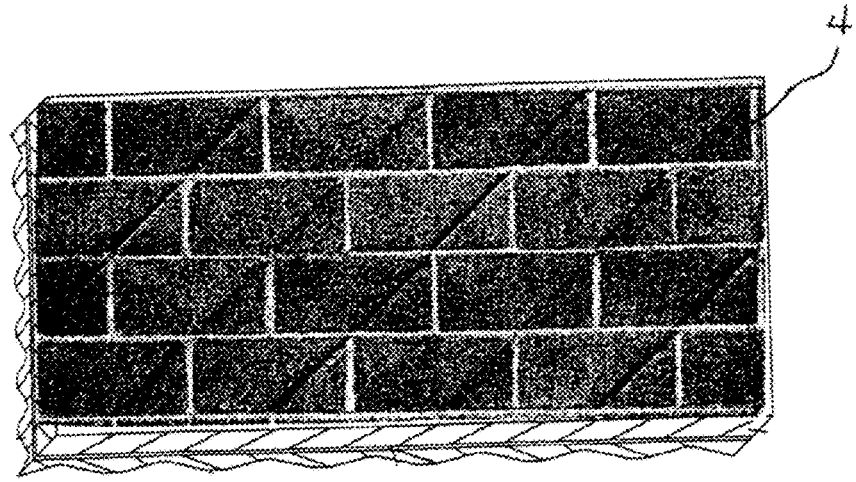

BUILDING MEMBRANE

CROSS REFERENCE TO RELATED APPLICATIONS

The present application claims benefit of U.S. Provisional Application No. 60/555,523 filed Mar. 23, 2004.

FIELD OF THE INVENTION

The present invention relates to a roofing, siding and covering membrane with a top surface comprising a printed design and at least one textured surface.

BACKGROUND OF THE INVENTION

The building industry has long used overlapping shingles in construction. More specifically, roofing shingles are generally made from a flexible sheet of felt which has been saturated or coated with a waterproof substance such as asphalt and then covered with a weather-resistant surface of granular mineral material, such as slate or granulated rock. Such shingles are usually rectangular in shape and combined with other substantially identical shingles in an overlapping relation to thereby provide a protective cover for a sloping roof surface. Roofing shingles have long served as relatively inexpensive alternatives to tile, slate and wood roofing shingles.

The felted fibrous substrate or membrane has been most commonly formed of rag, wood, paper, jute or other organic or inorganic fibers on a machine similar to that used for manufacturing paper. The felt material is impregnated with asphalt, generally a blown petroleum derivative, by immersion, flowing, spraying, roller coating, or by a combination of such treatments, with excess saturant removed by scraping. The waterproofing character of the asphalt is the main attribute of the final product and the felt serves in a secondary status as a carrier, substrate and preserver of the asphalt.

Molded plastic siding panels are also well known. Siding panels or shingles are often manufactured from synthetic thermoplastic polymers, including polyvinyl chloride, polypropylene, polyethylene, and various mixtures and copolymers thereof. This siding is also made to simulate the look of natural wood shingles in different styles including clapboard and dutchlap styles. Siding has also been produced to simulate brick and stone.

Materials such as slate and cedar roof shingles, and brick, stucco, or shake siding are desired due to their bulk, varied surface contours, shading, dimensionality, color, bulky edge profiles as well as other properties. It is desired to produce roofing and siding shingles having these properties at a low cost with manufactured materials. This has been accomplished in many different shingle designs by use of various shadings, shadow lines, multi-layers, tabs, and various tab designs and sheet designs with rectangular, hexagonal, arcuate, square and irregular tabs and tab recesses. Examples of such designs include, U.S. Pat. Nos. D484,992, D482,141, D452,917, D426,002, D406,362, D403,088, D403,087, D452,334, D388,195, and D376,660.

Manufacturers of building materials have long recognized that as they approach a more natural appearance of slate or wood shingles, the cost of the materials rises. The goal of producing inexpensive roofing and siding that has the physical appearance of more expensive wood and slate has eluded those skilled in the art.

The installation of conventional composite shingles is also tedious and time consuming since such shingles are applied in a regular pattern which requires precise alignment of adjacent courses so as to avoid a haphazard wavy appearance. Installing the above described shingles to a roofing or siding surface generally comprises the steps of:

a) affixing a course of shingles to a portion of a roofing or siding substrate;

b) affixing another course of the shingle to a remaining portion of the roofing or siding substrate and on a portion of a previously shingled portion having the shingles; and c) repeating step b N times until the roofing or siding substrate is covered with the shingles.

Typically laterally elongated plastic siding panels are nailed to a wall support surface in horizontal rows partially overlapping each other in order to provide a pleasing appearance combined with a water-resistant protective layer over the support surface. The plastic panels are typically installed by nailing several adjacent courses to a wall support surface, starting with a bottom course. A lower marginal edge region of each panel in courses above the bottom course overlaps a panel in the course immediately below. Side marginal edge regions of each panel overlap side marginal regions of adjacent panels.

A single ply building membrane is a membrane typically applied in the field using a one layer membrane material (either homogeneous or composite) rather than multiple layers built-up. These membranes have been widely used on low slope roofing and other applications but have not been acceptable replacements for shingles and many other roofing and siding materials. These membranes typically comprise bottom and top polyolefin based sheets with a reinforcement scrim. Other materials used for these membranes include but not limited to polyvinyl chloride (PVC), Chlorosulfonated polyethylene (CSPE or CSM), chlorinated polyethylene (CPE), ethylene propylene diene terpolymer (EPDM), atactic polypropylene (APP) modified bitumen, and styrene butadiene styrene (SBS) modified bitumen.

A typical method of preparing these membranes comprises the steps of: unwinding a support sheet, scrim or stabilizing material; coating the support by extrusion of a molten compounded polymers, and one or more fillers; cooling and solidifying the membrane; and winding the membrane into a roll.

SUMMARY OF THE INVENTION

The present invention relates to a novel and improved material useful as a building membrane for roofing, siding or the like. More particularly, this invention relates to a modified bitumen or thermoset or thermoplastic membrane preferably PVC and other resinous compositions containing polyvinyl chloride, CSPE, CPE, EPDM, APP modified bitumen, SBS modified bitumen, or a thermoplastic olefin (TPO). The membrane can comprise one or more layers, have a top and bottom surface, and may include a reinforcing scrim or stabilizing material. The scrim is typically of a woven, nonwoven, or knitted fabric composed of continuous strands of material used for reinforcing or strengthening membranes. Low-elongation strands can be provided in the direction parallel to one pair of membrane edges. The plastic resin composition can consist of chlorinated polyethylene containing titanium dioxide and no plasticizer and/or a foraminous, stress free reinforcing layer. The membrane may be a single-ply polypropylene, with an intermediately embedded reinforcing low-stress weft-inserted fabric in which the mounting area is along a longitudinal, warp-thread directional edge of each membrane. The ultra-high-molecular-weight polyethylene threads can be warp strands and the mounting area can also include warp threads of lower tenacity and lower breaking strength, fill threads being throughout the membrane of lesser breaking tenacity than the ultra-high-molecular-weight polyethylene strands.

The building membrane has a top surface comprising a predetermined printed design and at least one predetermined textured surface. The printed designs and a textured design on the top surface are preferably of a laid roof or laid siding.

Examples of such designs include, U.S. Pat. Nos. 6,205,734, 5,611,186, D484,992, D482,141, D480,485, D473,326, D467,356, D466,629, D456,089, D454,648, D452,917, D452,334, D449,121, D426,002, D422,719, D406,362, D403,088, D403,087, D452,334, D388,195, D379,672, D376,660, D366,336, D366,335, D366,124, D340,294, D336,347, D326,330, D317,506, D314,628, D314,439, D313,658, D313,278, D309,027, which are herein incorporated by reference.

Preferably, the thermoset or thermoplastic membrane is manufactured in rolls, strips, or panels and is used as a single ply membrane. A roll length is preferably about 100 ft. (30.5 m), 72 in. (1.8 m) in width, and 0.060 in. (1.5 mm) in thickness. The rolls can be between 12 in. to 20 feet wide or wider, and up to 600 feet in length or longer. Strips of the membrane are generally narrower than rolls. Siding panels are preferably but not limited to being 9 in. wide and up to 50 ft. in length. The preferred dimensions vary dramatically dependent upon whether the membrane is intended for siding or roofing and whether its packaging and installation are preferably in roll form or panel form.

A strip form of the invention is useful for among other things ridge cap applications on a roof and corner applications on siding. A ridge cap is a material or covering applied over the ridge of a roof. A ridge cap is used in hip and ridge applications. A hip is the inclined external angle formed by the intersection of two sloping roof planes. A ridge cap or corner embodiment (for convenience, ridge and corner may be used interchangeably herein) of the invention is installed by placing the strip over a roof ridge or hip, or over a side corner. The strip is fixed mechanically, adhesively, welded or by other known methods. The strip is placed such that it covers the ridge or corner and overlaps the intersecting field membranes.

Each roll, strip, or panel comprises the membrane with the textured design on at least one of its surfaces and the printed design on the top surface, both substantially covering that surface. The print design preferably comprises an image of laid roofing, laid ridge, or laid siding. In the embodiment that includes a textured top surface, the textured is preferably of laid roofing, ridge or siding. The present invention further contemplates that any desirable printed and/or textured design may be produced for roofing, ridging and siding. The designs are innumerable but may be for example, solid colors, patterns of colors, emblems, flags, thatching, artistic or photographic renderings of subjects, or lettering.

In the preferred embodiment, the printed and textured top surface of the affixed building membrane gives the appearance of successively installed shingles or the desired aesthetic effect. The membranes can be affixed to the building structure in successive courses of unrolled portions or panels covering the roof or side and lending it the appearance of building roofing or siding being fully installed.

Generally, there are four types of building membrane systems: 1) fully-adhered; 2) ballast loose-laid; 3) mechanically-fastened; and 4) self-adhering. The present building membrane may employ any known system. The building membrane may be affixed to the building structure using known methods such as floating systems or fasteners including nails, screws, plates or batten bars, tapes, or adhesives. The membranes may be mechanically linked to each successive course by known methods such as a tongue and groove or a dovetail design. Also, the membranes may be attached by overlapping one membrane with the selvage edge of the next membrane and adhering, welding, or mechanically attaching them together.

The print may be applied to the membrane using known impact and non-impact methods. These methods include the many intaglio methods, inkjet, laser, solid ink, dye sublimation, thermal wax and thermal autochrome where the ink is incorporated into the building membrane and activated by heat. The preferred ink transfer methods used to print on the building membrane are flexography or rotogravure.

Additionally, the building membrane is textured, preferably by embossing, with a texture on one or both sides. The texture may be a simulation of granules, slate, tile, shake or other desired texture. The texture may also be a simulation of wood planking such as clapboard, dutchlap, brick, stucco or other common siding. The texture on the top surface provides depth to the appearance of the membrane, may simulate the material texture printed on the membrane, provides a non-slip surface, and reduces glare.

When textured on the underside, the membrane is provided with greater surface area for an adhesive, means for mechanically bonding, and reducing the blocking or sticking of the membrane surfaces. The texturing can be done using known methods including engraving rollers, and presses. The texturing can also be done by chemical process such as for example in U.S. Pat. No. 3,293,108.

The depth of the texturing on the underside can vary greatly depending on the application but is preferably between 0.01 to 10.0 mm. The depth on the top surface can be greatly varied but is preferably between 0.01 mm to 10.0 mm.

When printing, the building membrane made of low surface tension materials such as TPO may be treated by flame, corona, etc to improve ink adhesion. The printing ink can comprise an inhibitor for preventing the foaming of a foamable material containing a blowing agent. The building membrane may be sealed with one or more coatings to provide additional protection from the sun, weather, tracking or other elements. The coatings may be applied to aid in ink absorption and limit ink spreading. The coatings may be applied at manufacture or on site by dipping, brushing, rolling or other known methods.

If it is desirable, a printed film may be laminated or otherwise fixed to the membrane's top surface. The film may take to and substantially fill any texturing on the membrane. Also a clear or translucent film may be affixed that alters a design printed on the membrane's top surface.

BRIEF DESCRIPTION OF THE DRAWINGS

FIG. 4 is a perspective view of a third embodiment of the present invention;

FIG. 5 is a top plan view of the siding embodiment shown in FIG. 4;

DETAILED DESCRIPTION OF THE DRAWINGS

The present invention contemplates the use of different materials for the building membrane. The base (bottom) and cap (top) layers can comprise both thermoset and thermoplastic materials. These include heat-sealable, reinforced single ply membranes composed of base and cap polymeric sheets (layers) with a fiber reinforcement scrim (middle) sandwiched between the other two layers. PVC and other resinous compositions containing polyvinyl chloride, CSPE, CPE, EPDM, APP modified bitumen, SBS modified bitumen, or thermoplastic olefin (TPO) membranes are all known in the art and appropriate for the present invention as are other known materials. The cap layer has a top surface and the base layer has a bottom surface.

Figure 9:
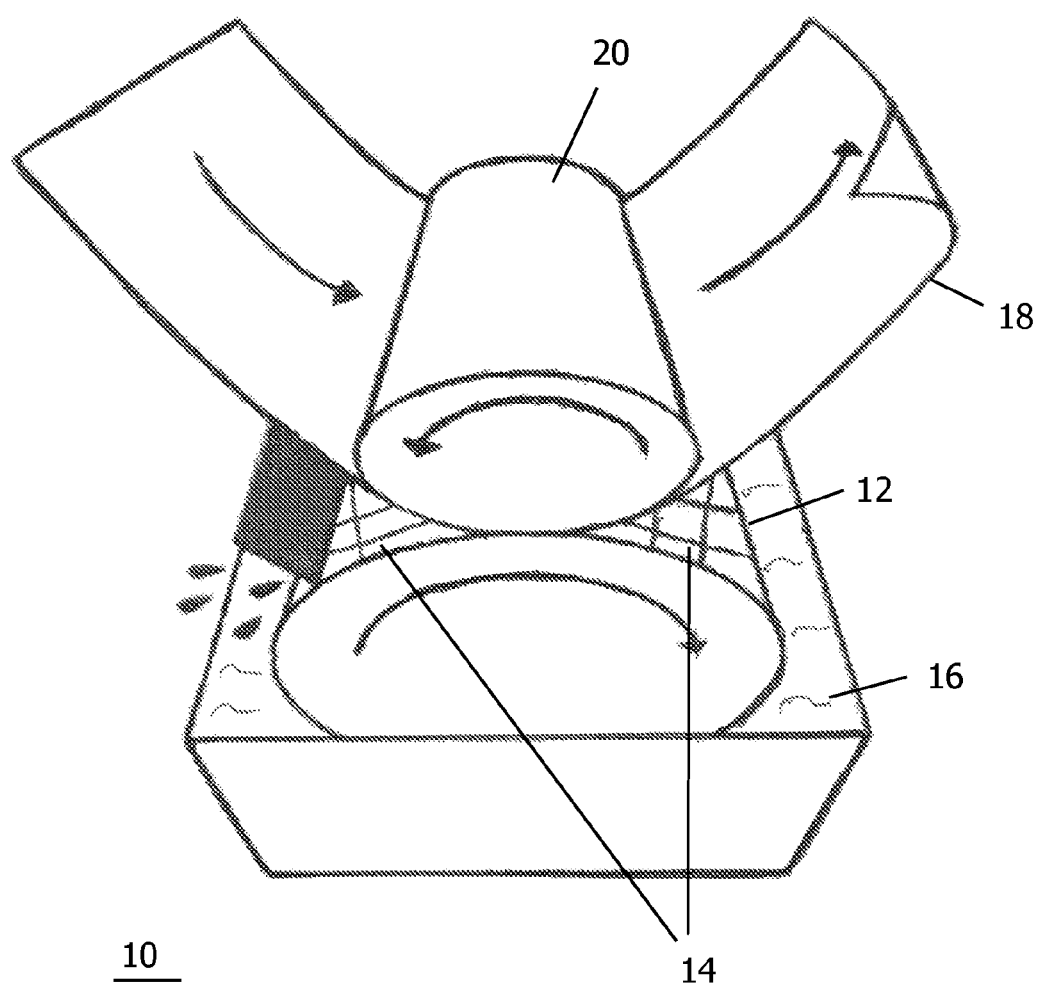
FIG. 9 is an illustrative example of an intaglio printing method.

The most preferred method of printing the design on the building membrane comprises rotogravure printing although any intaglio method is preferred. Rotogravure is an intaglio process using a rotary press and applied during the manufacture of the membrane. As shown in FIG. 9, intaglio printing methods 10 are methods that use depressions 14 directly on the printing plate or cylinder 12. The depressions 14 fill with ink 16 that is then transferred to the printing medium 18 by applying pressure from the plate or cylinder 20 to the medium 18. The depressed image is typically etched or engraved with chemicals or tools on to the press.

The ink used in the present invention is preferably water based acrylic ink or solvent based vinyl acetate ink for PVC and glycol ether acrylate, ethylene vinyl acetate, and other acrylate inks for TPO.

The membrane is textured on at least one surface. It is preferred that texturing is accomplished by embossing or known chemical processes. The bottom surface can be embossed with different patterns including random patterns, a polyhedron with a polygonal base and triangular faces meeting at a vertex, square and triangular pyramidal bases, circular or ellipsoidal cones, and others. This embossing helps prevent roll blocking for a rolled membrane and the adherence of the membrane to itself when panels are stacked. It is also useful when applying the membrane to the roofing substrate by providing more surface area for adhesives.

Texturing the top surface provides a textured look and feel, provides a non-slip surface, and helps reduce glare. Also, the texturing provides better solar reflectivity compared to granuled shingles of the same or similar color. When applied to a roof, the membrane can be embossed in a pattern or design simulating thatching, metal roofing, granuled shingles, cedar shakes, slate or other desired roofing materials. Thatching is typically, a roof or side covering usually made of straw, reed, or natural foliage (palms) bound together to shed water. Among other simulations, metal may simulate corrugated metal panels, and sheets, panels, strips, or flashing of copper or other metal.

When applied as siding, the top surface of the membrane can be textured to simulate common siding material such as metal, cedar shakes, clapboard, dutchlap, brick, stucco, wood or brownstone.

Of course both top and bottom surfaces may be textured in any combination described herein. Additionally, the embossing of the top surface may negatively correspond to the embossing of the bottom surface providing a male female relation. This can be done in a single embossing step with male and female dies.

Embossing can be accomplished by any known method including conventional embossing modules that typically use dies configured in a predetermined pattern. The dies may be rotary, belt or stamp. Dies including male and female dies configured in a predetermined shape and style may emboss the cap and bottom simultaneously. To emboss one surface, the membrane is placed tangentially to an engraved roller or belt and an opposing smooth roller or placed between an engraved stamp and a smooth surface. To emboss both sides, the membrane is positioned in between two dies or a male and female die as the two dies are pressed together in a complementary manner either as rollers or stamps, thereby embossing in the material.

Using a continuously pressing method the embossing dies are sequentially pressed onto the membrane material in solid phase, laid on a belt and continuously supplied with plural pressing means having a heating or cooling function to transfer patterns onto the membrane. A belt method uses a belt having an emboss pattern. The membrane can be pressed between the belt and a roller to transfer patterns onto the sheet. With the roller method, an emboss pattern is transferred onto a sheet by using a roller forming the emboss pattern on its outer circumferential face. When continuous embossing operations are employed, generally embossing rolls are engraved with the desired embossing pattern and the sheet material is passed through a nip defined by the embossing roll and a cooperating roll. The roller may be heated or applied while the membrane is hot enough for the pattern to be embossed.

Typically, as the membrane is advanced through its manufacturing steps, the embossing apparatus presses against the surfaces of the membrane while the temperature of the embossing apparatus rises. The membrane's resin is caused to flow into the mold cavities. After the embossing step, the pressure is released. In hot embossing methods the embossing surface(s) is brought into tangent contact with the membrane in a molten or softened state. The membrane is then cooled below its softening point resulting in the embossed pattern being retained. Also, cold embossing may be used, which embosses the pattern onto the membrane at a temperature below its softening state.

The installation of conventional siding and roofing shingles, brick, panels or membranes are applied in a regular pattern aligning adjacent courses and affixing the courses to a roofing or siding substrate in a repeating method.

There are many well known methods of creating laid siding. Plastic panels can be nailed or fastened to a wall support surface in horizontal rows partially overlapping each other. The panels are typically installed by fastening several adjacent courses to a wall support surface, starting with a bottom course. A lower marginal edge region of each panel in courses above the bottom course overlaps a panel in the course immediately below. Side marginal edge regions of each panel overlap side marginal regions of adjacent panels. Cedar shake siding is installed by fastening individual or several combined shingles to a siding substrate in successive lateral courses filling the desired area. The laying of brick, brownstone, or stone are well known processes of laying successive courses of the brick or stone and mortar. The laying of stucco is also a well known process with a well known appearance.

To create a laid roof, typically shingles of cedar, slate or asphalt are laid in well known ways with well know appearances. Generally the steps comprise:

a) affixing a course of shingles, tile, or slate to a portion of a roofing substrate;

b) affixing another course of the shingle, tile, or slate to a remaining portion of the roofing substrate and on a portion of a previously laid portion having the roofing material; and c) repeating step b N times until the roofing area is covered with the roofing material.

Figure 1:
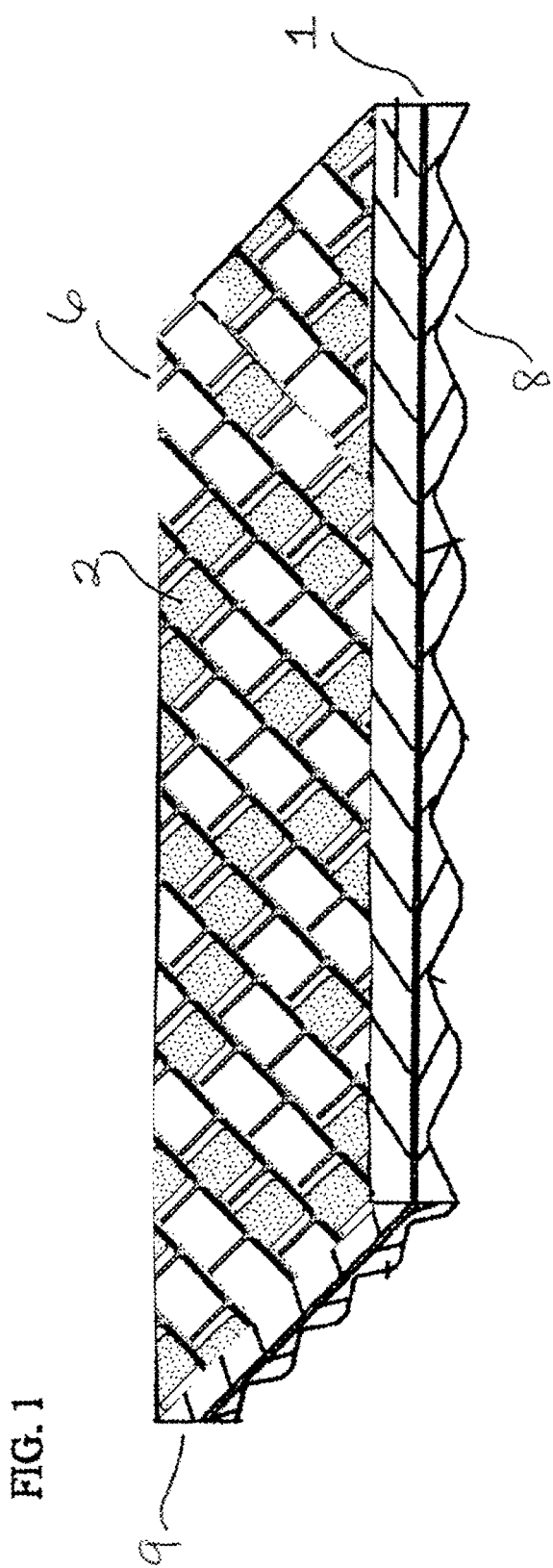
FIG. 1 is a perspective view of a first roofing embodiment of the present invention.
Figure 2:
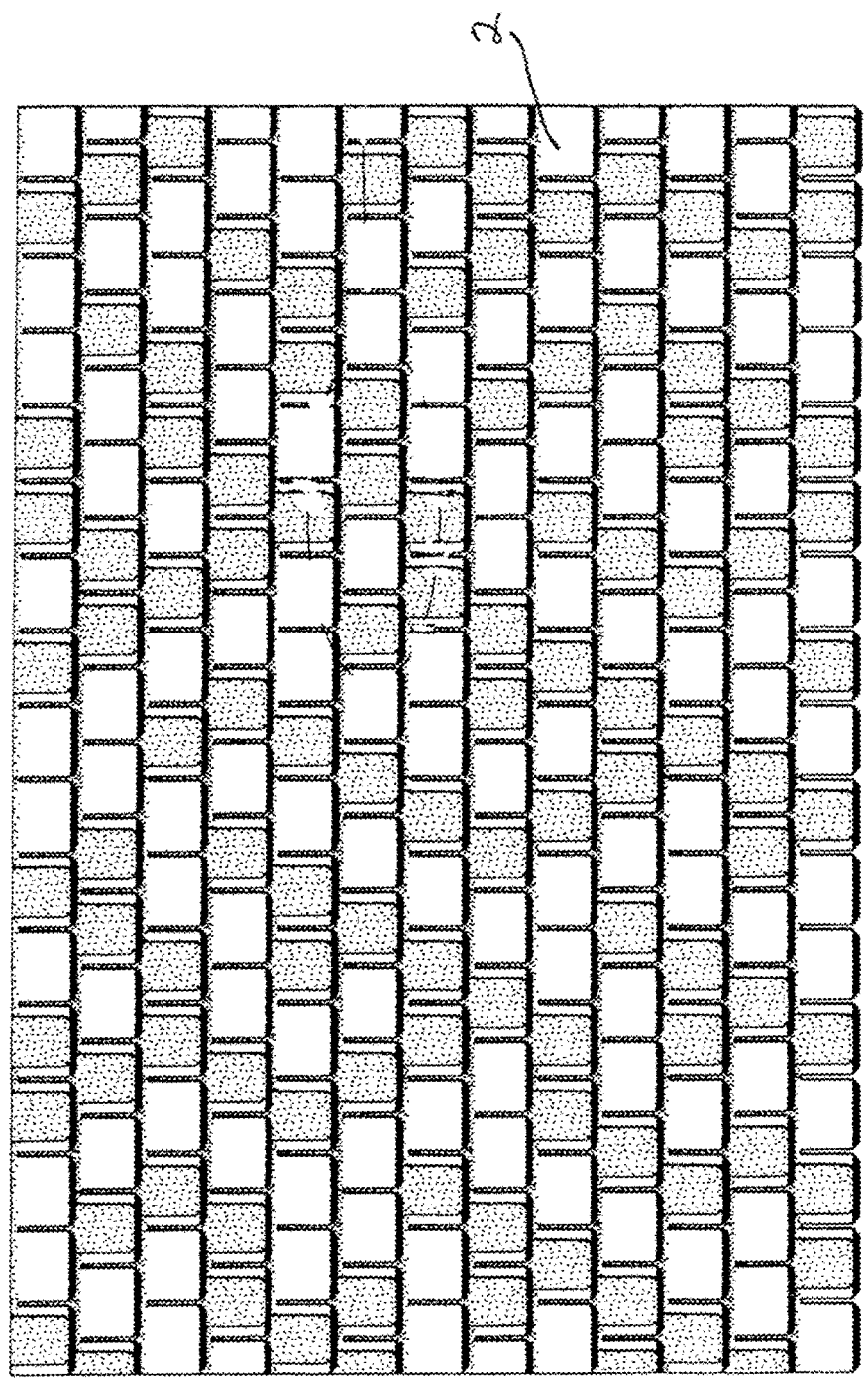
FIG. 2 is a top plan view of the embodiment shown in FIG. 1.
Figure 3:
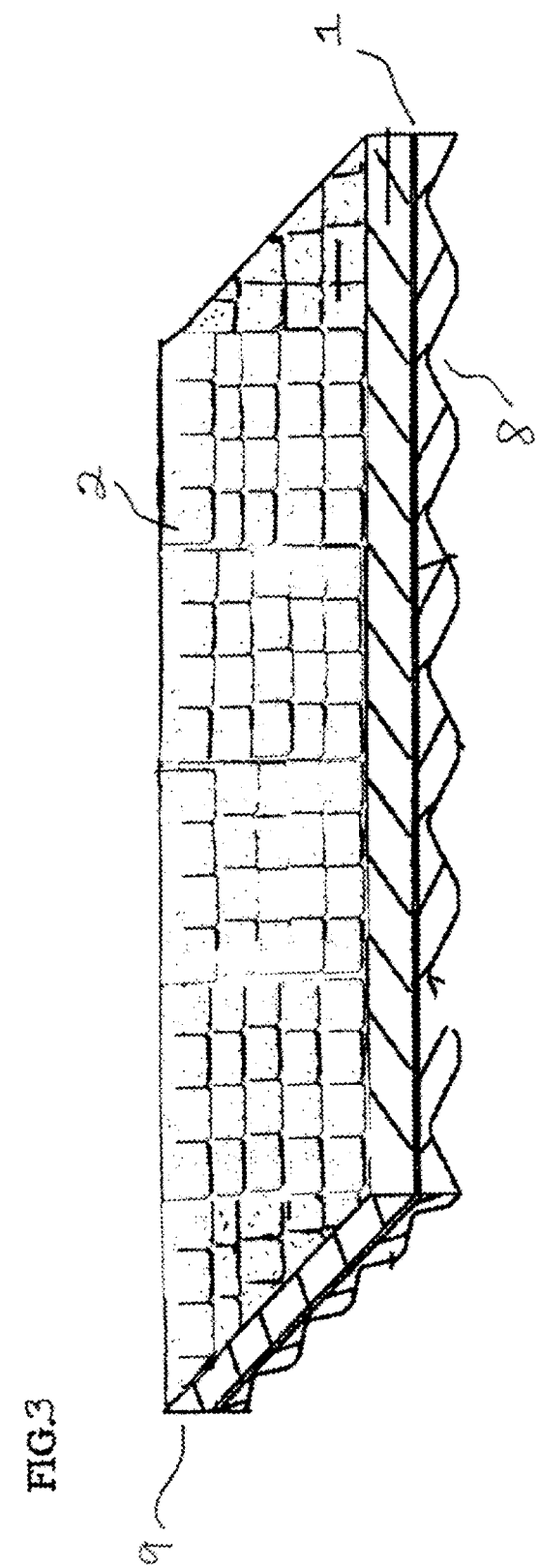
FIG. 3 is a top plan view of a second roofing embodiment of the present invention.

Shown in FIG. 1 is a single ply reinforced roofing membrane comprising a single ply membrane comprising a fiber reinforcement scrim 1 between a base 8 and a cap layer 9 and a printed design 2 of a laid roof on the top surface of the cap layer. In this figure the printed design 2 is of successive courses of asphalt shingles. This is shown in plan view in FIG. 2. However, the design is not limited to asphalt shingles but can include ceramic or other tiles, slate or cedar shingles, solid colors, patterns of colors, emblems, flags, artistic or photographic renderings of subjects, or lettering. An example of another embodiment is shown in FIG. 3.

The membrane in FIG. 1 also shows a textured pattern on the top and bottom surfaces. The embossing on the top surface simulates the pattern of successive courses of slate roofing shingles. This is again shown in FIG. 2 and in a second embodiment in FIG. 3. Other embossing patterns include cedar shingles, granulated asphalt shingles, tiles, emblems, lettering, and random patterns.

FIG. 4 is a perspective view of a third embodiment of the present invention. The invention is shown as a single ply siding panel. Here again the single ply siding membrane can be a single ply membrane 3 comprised of compounds selected from the group consisting of modified asphalt, thermoplastics and thermosets having a base 8 and a cap layer 9 and a printed design 2 of laid building siding on the top surface of the cap layer 9.

Figure 6:
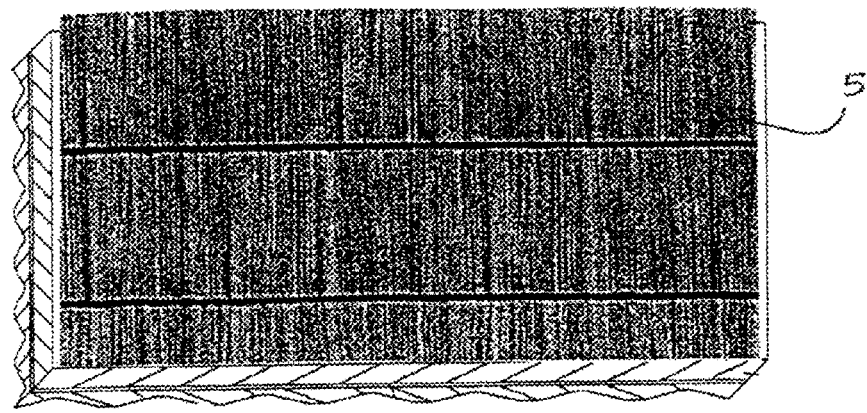
FIG. 6 is a top plan view of another siding embodiment of the present invention.

FIG. 5 demonstrates an embodiment of one possible printed and textured design for a sliding panel. FIG. 5 shows a printed and textured design of laid brick 4. Other possibilities for both the printed design and the textured design include clapboard, dutchlap, wood shakes 5, stone, stucco, or brownstone. Wood shakes 5 are demonstrated in FIG. 6.

Figure 7:
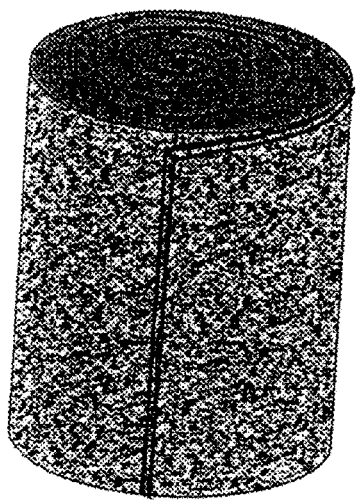
FIG. 7 is a perspective view of the invention in a roll form.
Figure 8:
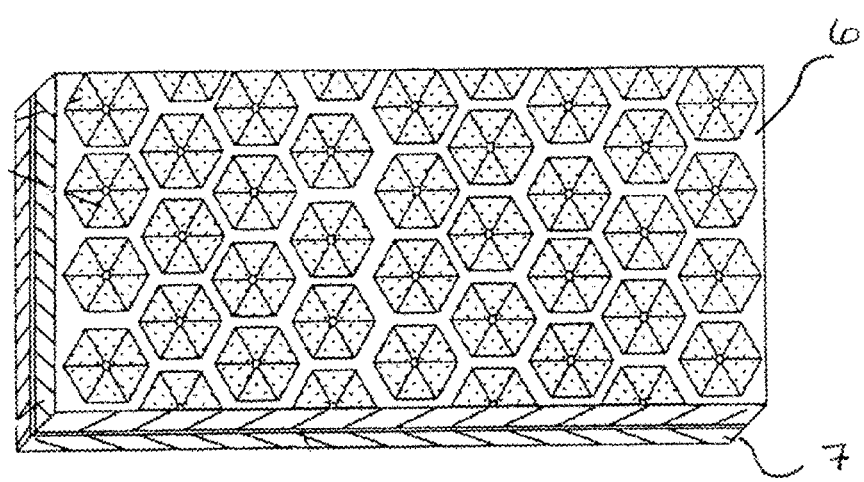
FIG. 8 is a perspective view of an embodiment of the invention with a printed cap layer and non-embossed bottom layer.

In FIG. 7 the invention is shown in the form of a roll. The invention may be manufactured in roll or strip form and cut into panels for packaging or left in such form and cut to any desired shape and size at the work site. In FIG. 8, the top surface 6 is printed but not textured and the bottom surface 7 is textured.

The present invention may be a single ply building membrane comprising a single ply membrane with a base and a cap layer, a predetermined printed design on the top surface of the cap layer, and a textured design on at least one layer of the membrane. As stated, the printed designs can be of any design desired and the textured design can also be of any design and on either or both layers. Additionally, the invention may comprise a textured top surface without a printed design.

Accordingly, it should be readily appreciated that the article of manufacture and method of the present invention has many practical applications. Additionally, although the preferred embodiments have been illustrated and described, it will be obvious to those skilled in the art that various modifications can be made without departing from the spirit and scope of this invention. Such modifications are to be considered as included in the following claims.

The invention claimed is:

1. A method of manufacturing a building membrane comprising the steps of:
   providing a reinforcing scrim;
   sandwiching the reinforcing scrim between a top layer and a bottom layer of compounds selected from a group consisting of thermoplastics and thermosets thereby forming a sandwiched membrane;
   providing a cylinder with printing depressions thereon;
   rolling the cylinder in ink so that the printing depressions fill with the ink;
   transferring via the cylinder a design formed by the depressions to the top layer of the sandwiched membrane;
   embossing the top layer with a first textured surface; and
   embossing the bottom layer with a second textured surface.

2. The method of manufacturing the building membrane of claims 1 wherein the first textured surface has a depth of 0.01 to 10.0 mm.

3. The method of manufacturing the building membrane of claims 1 wherein the second textured surface has a depth of 0.01 to 10.0 mm.

4. The method of manufacturing the building membrane of claim 1 further made by the step of:
   packaging the building membrane into a rolled membrane.

5. The method of manufacturing the building membrane of claims 4 wherein the second textured surface prevents roll blocking of the rolled membrane.

6. The method of manufacturing the building membrane of claim 1 further made by the step of:
   packaging the building membrane into strips.

7. The method of manufacturing the building membrane of claims 6 wherein the second textured surface prevents adherence of the building membrane when the strips are stacked.

8. The method of manufacturing the building membrane of claims 1 wherein the ink is at least one of a water based acrylic ink, a solvent based vinyl acetate ink, a glycol ether acrylate and an ethylene vinyl acetate.

9. The method of manufacturing the building membrane of claims 1 wherein the design is an image of laid roofing, laid ridge, or laid siding.

10. The method of manufacturing the building membrane of claims 1 wherein the first textured surface provides a non-slip surface.

11. The method of manufacturing the building membrane of claims 1 wherein the first textured surface reduces glare.

12. The method of manufacturing the building membrane of claims 1 wherein the first textured surface provides for solar reflectivity.

13. The method of manufacturing the building membrane of claims 1 wherein the first textured surface simulates thatching, metal roofing, granuled shingles, cedar shakes, slate or other desired roofing materials.

14. The method of manufacturing the building membrane of claims 1 wherein the second textured surface includes at least one of random patterns, a polyhedron with a polygonal base and triangular faces meeting at a vertex, square and triangular pyramidal bases and circular or ellipsoidal cones.

15. The method of manufacturing the building membrane of claims 1 wherein the second textured surface provides more surface area for adhesives when applying the building membrane to a roofing substrate.

* * * * *